United States Patent Office 3,637,891
Patented Jan. 25, 1972

3,637,891
PROCESS FOR THE PREPARATION OF OLEFINS
Brian Patrick McGrath, Crowthorne, Berkshire, and Christopher Patrick Cadman Bradshaw, Sunbury-on-Thames, Middlesex, England, assignors to The British Petroleum Company Limited, London, England
No Drawing. Filed Feb. 6, 1968, Ser. No. 703,265
Claims priority, application Great Britain, Feb. 13, 1967, 6,750/67, Patent 1,159,054
Int. Cl. C07c 3/62
U.S. Cl. 260—683 D
17 Claims

ABSTRACT OF THE DISCLOSURE

Olefins are prepared by coreacting an acyclic olefin of formula $R(R_1)C=CR_2(R_3)$ where the R substituents represent hydrogen atoms, alkyl or aryl groups, and an easily polymerisable olefin e.g. isobutene, in the presence of a catalyst comprising molybdena supported on alumina, the catalyst also containing a minor proportion of alkali or alkaline earth metal ions. Catalysts modified in this way catalyse the coreaction of the olefins without polymerising the easily polymerisable olefin to any great extent.

---

This invention relates to a process for the production of olefins.

Our U.S. Pat. No. 3,526,676 discloses and claims a process for the preparation of olefins which process comprises reacting an initial mixture of two dissimilar acyclic olefins having the formula $R(R_1)C=C(R_2)R_3$ and $$R_4(R_5)C=C(R_6)R_7$$

respectively, in the presence of an olefin disproportionation catalyst, the R substituents of the feed olefins representing hydrogen atoms or alkyl or aryl groups with the proviso that not more than two of the groupings $R(R_1)C<$, $R_3(R_2)C<$, $R_4(R_5)C<$ or $R_7(R_6)C<$ are the same.

A disproportionation catalyst is a catalyst which is capable of effecting the conversion of an olefin to a mixture of olefins having higher and lower carbon numbers than the feed olefin. Such catalysts include mixtures of molybdenum oxide and alumina, preferably containing cobalt oxides, and optionally containing minor amounts of alkali metal or alkaline earth metal ions, molybdenum, tungsten or rhenium carbonyls supported on alumina, silica or silica/alumina, tungsten oxide supported on alumina and rhenium hetoxide supported on alumina.

It is known that certain olefins, e.g., isobutene, polymerise very readily. For this reason it has not, to date, been possible to co-react a mixture of olefins containing an easily polymerisable olefin over a disproportionation catalyst without substantial polymerisation of the feed occurring.

It is an object of the present invention to provide a process for the preparation of olefins by the reaction of an olefinic mixture containing an easily polymerisable olefin, e.g., isobutene, over a disproportionation catalyst.

We have now discovered that if to a molybdena on alumina catalyst there is added a minor proportion of alkali or alkaline earth metal ions, then the catalyst is suitable for use in the coreaction of an olefinic mixture containing an easily polymerisable olefin and does not polymerise the olefin to any great extent. Alternatively the ions may be added to the alumina support before combining with the molybdena.

Commercially available alumina usually contains a minor proportion of sodium ions e.g. about 0.03% by weight, resulting from the process of manufacture. Our invention however is based on the discovery that selective catalysts may be obtained by adding either to the alumina support or to the catalyst comprising molybdena on alumina a quantity of alkali or alkaline earth metal ions over and above that left over from the process of manufacture. We believe that the alkali or alkaline earth metal ions are deposited on the surface.

Thus according to the present invention there is provided a process for the preparation of olefins comprising reacting an initial mixture of an acyclic olefin of formula $R(R_1)C=CR_2(R_3)$, the substituents representing hydrogen atoms or alkyl or aryl groups, with an easily polymerisable olefin in the presence of a catalyst comprising molybdena supported on alumina, wherein the alumina support or the molybdena on alumina catalyst has been modified by the addition of a minor proportion of alkali or alkaline earth metal ions thereto.

The catalyst used in the present invention comprises oxides of molybdenum and aluminium and preferably also an oxide of cobalt, and contains a minor proportion of alkali or alkaline earth metal ions, preferably sodium ions.

The amount of the respective oxides present may vary, but the catalysts will generally contains 0.5–30% by weight $MoO_3$, 0–20% by weight CoO and 50–99.5% by weight $Al_2O_3$. Catalysts containing oxides of molybdenum, cobalt and aluminium are commercially available and illustrative of such materials are those containing 2.5–5% by weight CoO and 12.5–25% by weight $MoO_3$. A particularly suitable catalyst contains 3.8% by weight CoO and 13.8% by weight of $MoO_3$. These mixed oxide catalysts are hereinafter referred to as the base catalyst.

The optimum metal ion content depends upon the choice of metal ion. Catalysts containing too little metal ion will retain some polymerisation activity, whilst those containing too much will have a reduced catalytic effect on the co-reaction of the olefins.

Sodium, potassium and calcium ions are the preferred alkali or alkaline earth metal ions. In these instances the catalyst should contain 0.02–5.0% by weight of added metal ion, preferably 0.1–1.0% by weight.

The incorporation of the alkali or alkaline earth metal ions into the base catalyst for use in the present invention may be brought about by known methods, for example, by treating the base catalyst with an aqueous solution of an alkali metal salt, such as sodium carbonate, sodium bicarbonate or sodium acetaate, separating the solid catalyst from the liquid medium, followed by drying.

Before use in the reaction, the catalysts are activated by subjecting them to a thermal treatment, either in a stream of inert gas such as nitrogen, carbon dioxide or helium; or preferably in a stream of air or oxygen followed by a final treatment in an inert gas. Preferably the catalysts are heated in air at a temperature in the range 300°–900° C. for 1 minute to 20 hours, and then under similar conditions in an inert gas.

Suitable easily polymerisable olefins include tertiary olefins containing the grouping

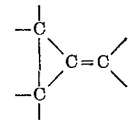

and secondary olefins containing the grouping

wherein Ar represents an aromatic radical.

The preferred easily polymerisable olefin is isobutene.

A very suitable feedstock for the process is a mixture consisting essentially of butene-2 and isobutene since the reaction products, propylene and 2-methylbutene-2 are very desirable olefins. The uses of propylene are too well-known to require elaboration and 2-methylbutene-2 on dehydrogenation yields isoprene.

The process may be carried out in a continuous manner, using the catalyst in the form of a fixed bed, a fluidised bed or a moving bed.

The conditions under which the olefins react may vary with the composition of the feed and the desired products.

Reaction temperatures may range from 80° to 500° C., temperatures in the range 90°–240° C. being preferred.

Reaction pressures may be in the range 0–2000 p.s.i.g.

In a continuous process, reaction times may vary between 0.01 second and 120 minutes, preferably between 0.1 second and 10 minutes.

In a batch process, suitable olefin/catalyst weight ratios are in the range 1000:1 to 1:1.

If desired, the process may be carried out in the presence of an inert diluent, for example a paraffinic or cycloparaffinic hydrocarbon.

The invention is illustrated by the following examples. It is to be understood that Example 1 is provided for purposes of comparison only and is not in accordance with the present invention.

EXAMPLE 1

A poorly crystalline alumina of surface area 250 m.$^2$/g., micropore volume (300 A.), 0.37 ml./g. and an average micropore diameter of 50 A. was heated in air at 580° C. for 2 hours, followed by a similar treatment in nitrogen.

The alumina was converted into a catalyst for the co-reaction of olefins, and containing 10% by weight $MoO_3$, by impregnation of the dry alumina with an aqueous solution of ammonium molybdate, containing the theoretical amount of molybdenum, followed by drying at 110° C. and fluidisation in a stream of air for 24 hours at 580° C. Before use the catalyst was given a further 1 hour treatment with nitrogen at 580° C.

The catalyst was then tested for the co-reaction of isobutene and butene-2. Reaction conditions and experimental results are shown in the following table.

EXAMPLE 2

An aqueous solution of 0.25 N $NaHCO_3$ was continuously circulated over the activated alumina of Example 1 for 25 hours at ambient temperature. The solid was filtered off and dried at 110° C. The alumina was then activated and treated as in Example 1 to give a catalyst containing 10% by weight of $MoO_3$ and 0.25% by weight sodium ion.

The catalyst was tested for the co-reaction of isobutene and butene-2.

that the sodium ion pretreatment of the catalytic alumina completely inhibited polymerisation and allowed considerable co-reaction to take place. Example 3 shows that calcium ion pretreatment of the alumina also inhibited isobutene polymerisation although to a lesser extent.

Our British Patent No. 1,159,053 claims a process for the preparation of olefins which process comprises reacting an initial mixture of an acyclic olefin of formula $R(R_1)C=C(R_2)R_3$, the R substituents representing hydrogen atoms or alkyl or aryl groups, with an easily polymerisable olefin in the presence of a catalyst comprising a carbonyl of molybdenum, tungsten or rhenium, supported on silica and/or alumina, the catalyst support having been modified by adding thereto a minor proportion of alkali or alkaline earth metal ions prior to combining the support with the carbonyl.

What we claim is:

1. A process for the preparation of propylene and isopentenes which comprises reacting a feedstock comprising normal butenes and isobutene, said isobutene being an easily polymerizable olefin subject to substantial polymerization over a disproportionation catalyst, in the presence of a catalyst comprising molybdena supported on alumina in which the alumina support or the molybdena on alumina catalyst is modified by depositing on the surface thereof from 0.1% to 1.0% by weight of alkali or alkaline earth metal ions.

2. A process according to claim 1 wherein the catalyst also comprises an oxide of cobalt.

3. A process according to claim 1 wherein the catalyst contains a minor proportion of sodium, potassium or calcium ions.

4. A process according to claim 1 wherein the catalyst contains 0.5–30% by weight $MoO_3$, 0–20% by weight CoO and 50–99.5% by weight $Al_2O_3$.

5. A process according to claim 4 wherein the catalyst contains 2.5–5% by weight CoO and 12.5–25% by weight $MoO_3$.

6. A process according to claim 5 wherein the catalyst contains 3.8% by weight CoO and 13.8% $MoO_3$.

7. A process according to claim 1 wherein before use in the reaction, the catalyst is activated by subjecting it to a thermal treatment, either in a stream of inert gas such as nitrogen, carbon dioxide or helium; or in a stream of air or oxygen followed by a final treatment in an inert gas.

8. A process according to claim 7 wherein the catalyst is activated by heating in air at a temperature in the range 300°–900° C. for 1 minute to 20 hours, and then under similar conditions in an inert gas.

TABLE

| Ex. No. | Feed x | Temperature, °C. | Pressure, atm. | GHSV | Products, percent wt. | | | | | | | |
|---|---|---|---|---|---|---|---|---|---|---|---|---|
| | | | | | $C_2H_4$ | $C_3H_6$ | $C_4H_8$-1 | $C_4H_8$-1$^2$ | i-$C_4H_8$ | n-$C_5H_{10}$ | i-$C_5H_{10}$ | >$C_5$+ |
| 1 | 1 | 190 | 1 | 2,400 | Trace | 1.5 | 4.5 | 75.6 | 0.4 | 1.9 | Trace | 15.9 |
| 2 | 2 | 200 | 1 | 400 | 0.2 | 10.1 | 2.2 | 23.7 | 52.2 | 1.8 | 9.8 | 0.0 |
| 3 | 2 | 210 | 1 | 2,000 | Trace | 3.3 | 2.1 | 62.4 | 17.1 | 1.8 | 2.8 | 10.5 | xFeed 1: Isobutene 16.7%, butene-2 83.3% wt; Feed 2: Isobutene 30.0%, butene-2 70.0% wt.
+Mainly $C_4$ oligomers.

EXAMPLE 3

The experiment described with reference to Example 2 was repeated with the difference that a 0.5 N solution of calcium acetate was employed in place of the 0.25 N solution of $NaHCO_3$ to give a catalyst containing 1.15% by weight calcium ion.

Example 1 shows that $MoO_3$ on untreated alumina causes polymerisation of isobutene to the exclusion of co-reaction of the olefins. The conditions selected in Example 2 would be expected by those skilled in the art to encourage polymerisation even more but the results show 9. A process according to claim 1 wherein the feedstock consists essentially of butene-2 and isobutene.

10. A process according to claim 1 wherein the process is carried out in a continuous manner, using the catalyst in the form of a fixed bed, a fluidised bed or a moving bed.

11. A process according to claim 1 wherein the reaction temperature is in the range 80° to 500° C.

12. A process according to claim 11 wherein the reaction temperature is in the range 90° to 240° C.

13. A process according to claim 1 wherein the reaction pressure is in the range 0 to 2000 p.s.i.g.

14. A continuous process according to claim 1 wherein the reaction time is between 0.01 second and 120 minutes.

15. A continuous process according to claim 14 wherein the reaction time is between 0.1 second and 10 minutes.

16. A batch process according to claim 1 wherein the olefin/catalyst weight ratio is in the range 1000:1 to 1:1.

17. A process according to claim 1 wherein the process is effected in the presence of an inert diluent, for example a paraffinic or cyclo-paraffinic hydrocarbon.

References Cited
UNITED STATES PATENTS

| | | | |
|---|---|---|---|
| 3,261,879 | 7/1966 | Banks | 260—683 |
| 3,526,676 | 9/1970 | Turner et al. | 260—683 |

DELBERT E. GANTZ, Primary Examiner

C. E. SPRESSER, JR., Assistant Examiner

U.S. Cl. X.R.

260—668, 677

UNITED STATES PATENT OFFICE
CERTIFICATE OF CORRECTION

Patent No. 3,637,891　　　　　　　　Dated　January 25, 1972

Inventor(s)　Brian Patrick McGrath et al.

It is certified that error appears in the above-identified patent and that said Letters Patent are hereby corrected as shown below:

Column 2, line 10, after "the" add -- R --;

line 22, change "contains" to -- contain --;

line 45, change "acetaate" to -- acetate --.

Column 3, lines 52-62, in the Table, 9th Column, change "$C_4H_8-1^2$" to -- $C_4H_8-2$ --.

Signed and sealed this 2nd day of July 1974.

(SEAL)
Attest:

EDWARD M. FLETCHER, JR.　　　　　　　C. MARSHALL DANN
Attesting Officer　　　　　　　　　　Commissioner of Patents